United States Patent
Menezes

(10) Patent No.: US 6,886,938 B1
(45) Date of Patent: May 3, 2005

(54) PROGRESSIVE ADDITION LENSES WITH AN ADDITIONAL ZONE

(75) Inventor: Edgar V. Menezes, Roanoke, VA (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 10/695,933

(22) Filed: Oct. 29, 2003

(51) Int. Cl.⁷ .................................................. G02C 7/06
(52) U.S. Cl. ........................................ 351/169; 351/177
(58) Field of Search .................................. 351/168, 169, 351/170, 171, 172

(56) References Cited

U.S. PATENT DOCUMENTS

| | | |
|---|---|---|
| 5,112,351 A | 5/1992 | Christie et al. |
| 5,777,716 A | 7/1998 | Miura |
| 5,861,935 A * | 1/1999 | Morris et al. ............... 351/169 |
| 5,864,378 A | 1/1999 | Portney |
| 6,260,966 B1 | 7/2001 | Sawano et al. |
| 6,669,337 B2 | 12/2003 | Welk et al. |

OTHER PUBLICATIONS

U.S. patent application Ser. No. 10/440,967, Gupta et al.

* cited by examiner

Primary Examiner—Scott J. Sugarman

(57) ABSTRACT

The invention provides multifocal lenses containing at least four zones of refractive power. The zones are positioned such that the wearer is able to use the inferior-most portion of the lens to clearly view objects at distances more than about 45 cm from the eye.

20 Claims, 7 Drawing Sheets

PROGRESSIVE ADDITION LENSES WITH AN ADDITIONAL ZONE

FIELD OF THE INVENTION

The present invention relates to multifocal lenses. In particular, the invention provides a multifocal lens that has a zone in addition to the distance, intermediate and near zones, which zone is located inferior to the near zone.

BACKGROUND OF THE INVENTION

The use of ophthalmic lenses for the correction of ametropia is well known. For example, multifocal lenses, such as progressive addition lenses ("PALs"), are used for the treatment of presbyopia. Typically, the progressive surface of a PAL has three zones, one zone each of distance, intermediate, and near vision power. The distance vision power zone permits viewing of objects located at more than 70 cm from the viewer, while the intermediate zone permits viewing of objects at between 45 and 70 cm, such as a computer monitor and the near vision power zone permits viewing of objects at less than about 45 cm. The boundaries between each of these zones are typically continuous and blended so that the image jump between the zones is minimized. Thus, the refractive power is provided in a gradual, continuous progression of vertically increasing dioptric power from far to near focus, or top to bottom of the lens.

In conventional PALs, the near vision power zone extends to the bottom edge, or inferior-most portion, of the lens. Because of this, viewing of objects through this portion of the lens, which objects are outside of the near vision range, are problematic. For example, the ground or stairs when viewed through this zone will appear blurred to the lens wearer and the wearer must remove the lenses or stoop to see the ground or stairs clearly.

One method of overcoming this problem is to provide a near vision zone of a specified length and to decrease the add power in the portion of the lens inferior to the near vision power zone. Typically, the rate of decrease will be very slow so that significant unwanted astigmatism, meaning astigmatism introduced or caused by one or more of the lenses' surfaces, does not result. However, this does not achieve the objective of providing clear visualization of the ground or stairs. If the rate of decrease is faster, in addition to significant unwanted astigmatism, prism and magnification changes cause objects viewed through this zone to shift and change in size.

Therefore, a need exists for a progressive addition lens that provides a zone inferior to the near vision zone that overcomes these disadvantages.

DESCRIPTION OF THE INVENTION AND ITS PREFERRED EMBODIMENTS

The present invention provides multifocal lenses, and methods for producing the lens, which lenses contain at least four zones of refractive power. The zones are positioned such that the wearer is able to use the inferior-most portion of the lens to more clearly, as compared to conventional PALs, view objects at distances more than 45 cm from the eye.

In one embodiment, the invention provides a multifocal lens, comprising, consisting essentially of, or consisting of: a.) a distance vision power zone; b.) a near vision power zone comprising an add power; c.) an intermediate vision power zone between the distance and near vision power zones; and d.) a fourth zone located inferior to the near vision power zone, wherein the fourth zone has a constant power that is within about 20 to about 80% of the add power. By "add power" is meant the amount of dioptric power difference between the near and far vision zones of the lens along the central, or 90–270 degree, meridian of the lens.

Figure 1:
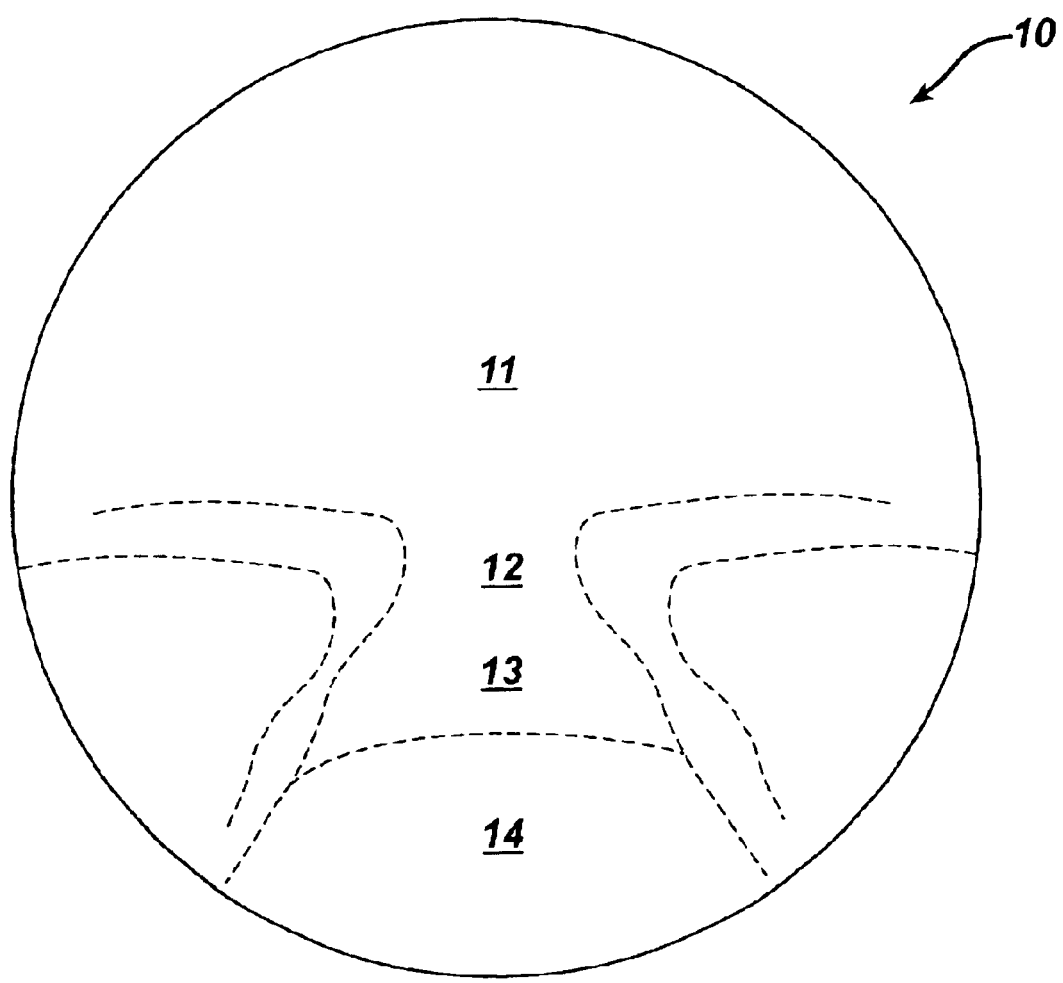
FIG. 1 depicts a plan view of a surface of a lens of the invention.

In FIG. 1 is depicted one embodiment of lens of the invention. Lens 10, from superior to inferior, or top to bottom, of the lens, has distance vision zone 11, intermediate vision zone 12, near vision zone 13, and a fourth zone 14. In lens 10, and in all embodiments of the invention, preferably the distance vision zone is a zone of refractive power suitable for correcting the distance vision acuity of the lens wearer. The intermediate vision zone, located adjacent to and between the far and near vision zones, is a zone of refractive power connecting the far and near vision zones. The refractive power in intermediate zone 12 continuously increases in power across the zone from that of the distance vision zone 11 to that of the near vision zone 13. The near vision zone 13 preferably provides refractive correction for the lens wearer's near vision acuity.

The fourth zone 14 is located at the inferior-most portion of the lens and adjacent to the near vision zone. The refractive power of this fourth zone is about 20 to about 80%, preferably about 25 to about 75% of the add power. The fourth zone is of constant dioptric power and preferably is blended continuously with the near zone and discontinuously with the periphery of the surface.

The multifocal surfaces of the lenses of the invention maybe continuous, partially continuous, or fully discontinuous aspheric surface. By "discontinuous" is meant that there is a discontinuity which is either a discontinuity in one or more functions describing the surface geometry or a discontinuity in the slope of the surface at any point $\partial(z)/\partial(x,y)$ of the surface.

If the surface is continuous, the contour of each of the power zones are blended so that no lines are visible when viewing the lens. If the surface is fully discontinuous, an image jump will result as one's line of sight moves from zone to zone. If partially discontinuous, the zones are continuous along the central meridian of the surface, but are discontinuous in their peripheries.

The superior-most boundary of zone 14 is adjacent to the inferior-most portion of the near vision zone and preferably is about 8 mm below the end of the channel. By "channel" is meant the line between the fitting point of the lens and the center of the near zone. By "fitting point" is meant the point on a lens that aligns with the wearer's pupil in its distance viewing position when the wearer is looking straight ahead and at which point the lens correction is that needed to correct the wearer's distance vision acuity. The width of the fourth zone may be about 5 to about 25 mm and may be any convenient shape. The length of the zone will be dependent upon the desired shape of the resulting lens. In general the length of the zone will be about 10 to about 20 mm.

The lenses of the invention may be designed using any known method including, without limitation, commercially available design software such as CODE V™, ZEMAX™ and the like. The additional zone may be designed integrally with the other zones of the surface or separately. If designed separately, the zone must be offset, tilted, and blended relation to the other ones so as to ensure power blending and minimization of unwanted astigmatism.

One method of designing the surfaces of the lenses of the invention is to express the surface in terms of sag values (Z). A fourth zone surface $Z_S(x, y)$ may be tilted by an angle T in the y-direction and offset by an amount O in the z-direction to produce a new surface $Z'_S(x, y)$ using the equation:

$$Z'_S(x, y) = Z_S(x, y) + T*y + O \quad (I)$$

A blending function, F(x, y), is used to combine the surface $Z'_S(x, y)$ with a progressive surface $Z_P(x, y)$ to produce the desired surface, Z(x, y) according to the equation:

$$Z(x, y) = F(x, y)*Z_P(x, y) + \{1 - F(x, y)\}*Z'_S(x, y) \quad (II)$$

wherein $0 \leq F(x, y) \leq 1$. This surface, Z(x, y), maybe then combined with a complementary spherical or toric surface in any conventional manner to produce a progressive addition lens with the fourth zone according to the invention.

A fourth zone may be incorporated into more than one surface, for example into two progressive surfaces both of which are used to form opposite surfaces of a lens and which surfaces may the same or different from each other with respect to power, shape or both. If more than one additional zone is used in such a lens, care must be taken to ensure that the viewing needs of the lens wearer are met when the wearer is using the additional zones.

The lenses of the invention may be designed and manufactured using any suitable methods. A preferred method of designing the lenses of the invention is disclosed in U.S. Pat. No. 6,302,540 incorporated in its entirety herein by reference. The zones of the lens may be present on one surface or split between the front, or object side, and back, or eye side, surface of the lens. For example, each of the front and back surfaces may have four zones and each such zone may provide a portion of the power desired for that zone. In such an embodiment, preferably the front and the back surfaces are misaligned. By "misaligned" is meant that the surfaces, and thus the areas of unwanted astigmatism, are arranged or disposed in relation to one another so that a portion or all of the areas of maximum, localized, unwanted astigmatism, or the highest measurable level of unwanted astigmatism, contributed by one surface do not substantially coincide with one or more maximum, localized, unwanted astigmatism areas of the other surface.

Alternatively, the front or back surface of the lens may provide the far, intermediate and near vision zones and the other lens surface may provide the fourth zone. In a preferred embodiment, the fourth zone is provided on the back surface of the lens and the near vision zone is provided on the front surface. In yet another embodiment, the lenses of the invention may provide cylinder correction on one or both surfaces.

The lenses of the invention may be fabricated by any convenient means and constructed of any known material suitable for production of ophthalmic lenses. Suitable materials include, without limitation, mineral glass, polycarbonate, allyl diglycol, poly (methyl methacrylate), acrylates, polyacrylates, polyurethanes and the like. Such materials are either commercially available or methods for their production are known. Further, the lenses may be produced by any conventional lens fabrication technique including, without limitation machining, grinding, whole lens casting, molding, thermoforming, laminating, surface casting, or combinations thereof. Casting may be carried out by any means, but preferably is performed by surface casting including, without limitation, as disclosed in U.S. Pat. Nos. 5,147,585, 5,178,800, 5,219,497, 5,316,702, 5,358,672, 5,480,600, 5,512,371, 5,531,940, 5,702,819, and 5,793,465 incorporated herein in their entireties by reference. Preferably, lens manufacturing is carried out by machining both surfaces of a polymeric or mineral glass article that has planar or curved surfaces. Regardless of the manufacturing process used, the lens may include a suitable coating including, without limitation, a scratch resistant coating, an anti-reflective coating, a photochromic coating, or the like.

The invention will be clarified further by a consideration of the following, non-limiting examples.

EXAMPLES

Example 1

Figure 2:
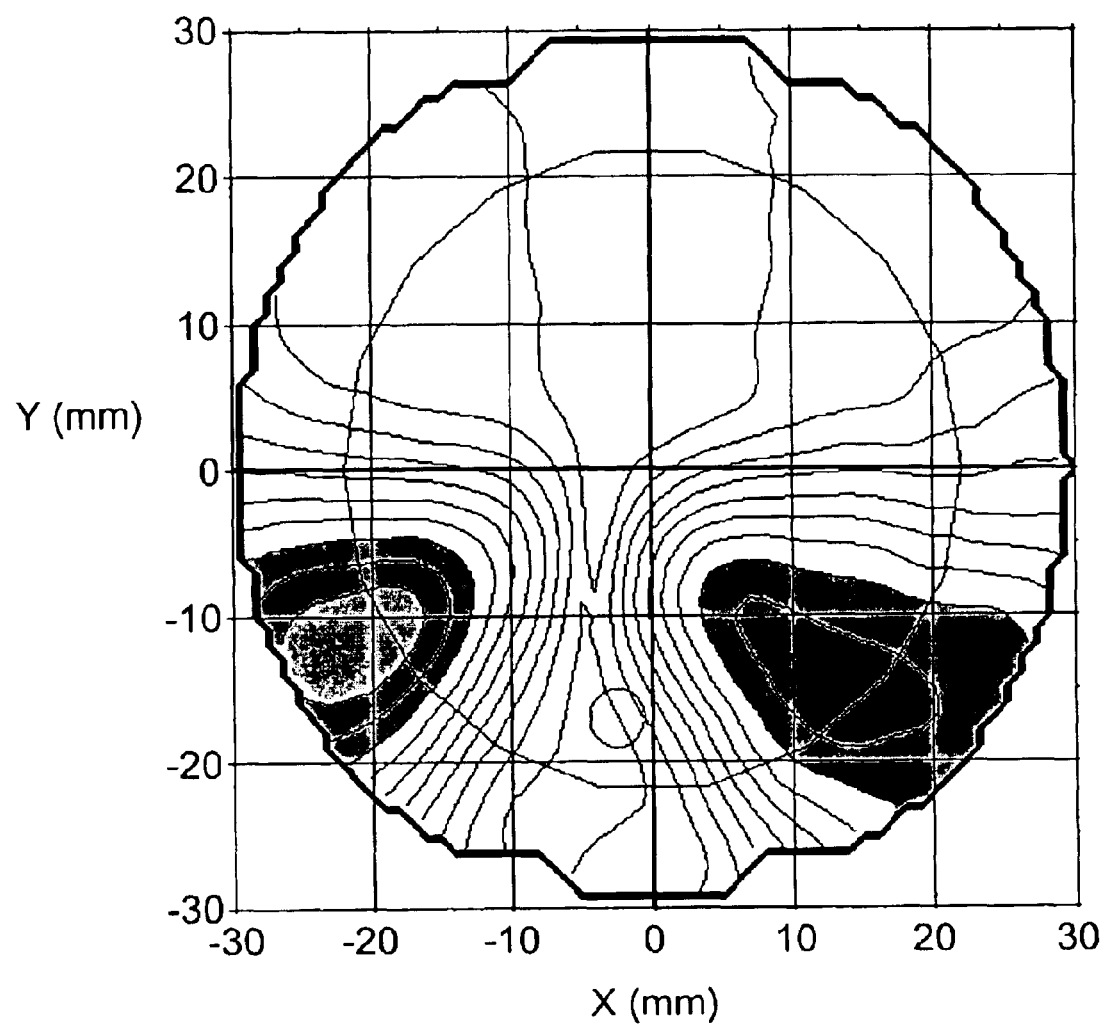
FIG. 2 depicts a scanned image of a power contour map of the lens of Example 1.
Figure 3:
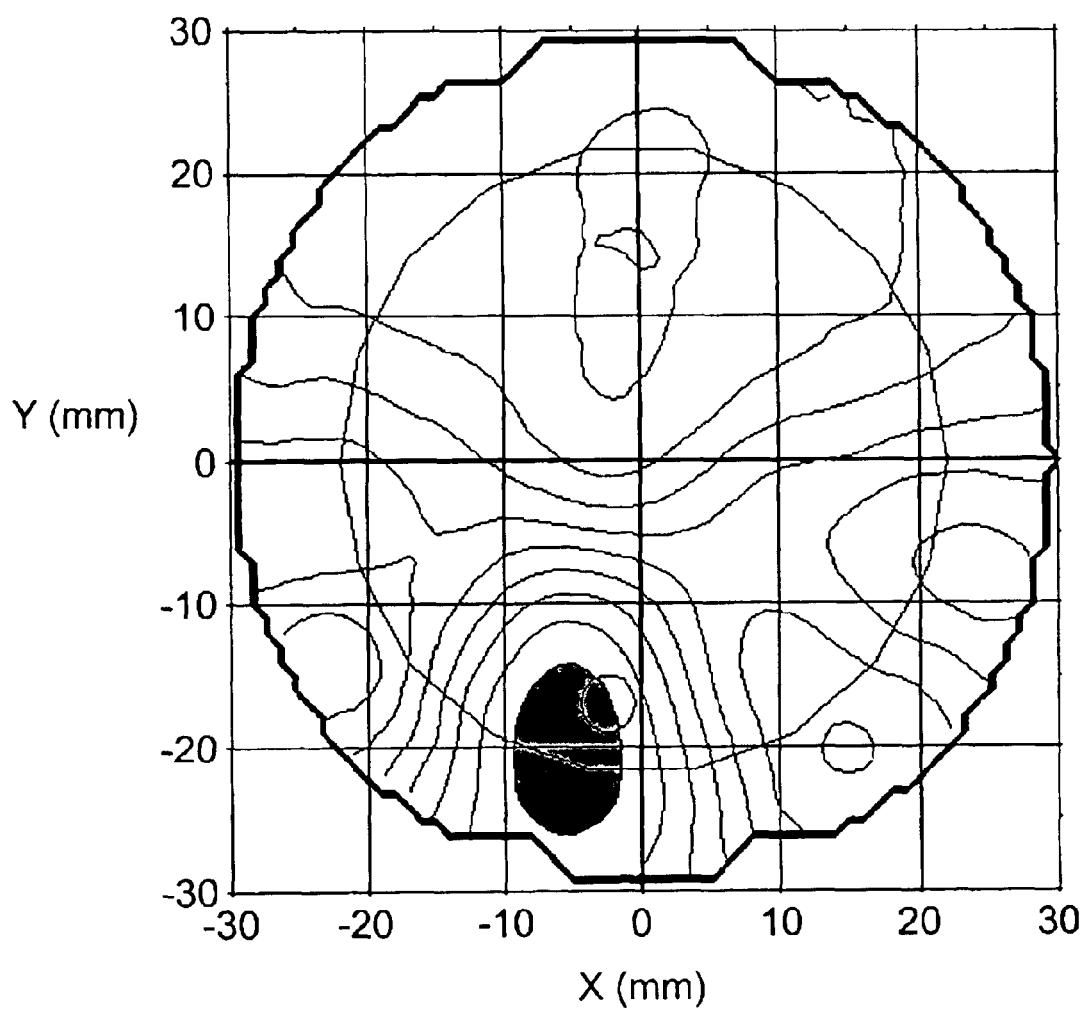
FIG. 3 depicts a scanned image of an astigmatic contour map of the lens of Example 1.
Figure 4:
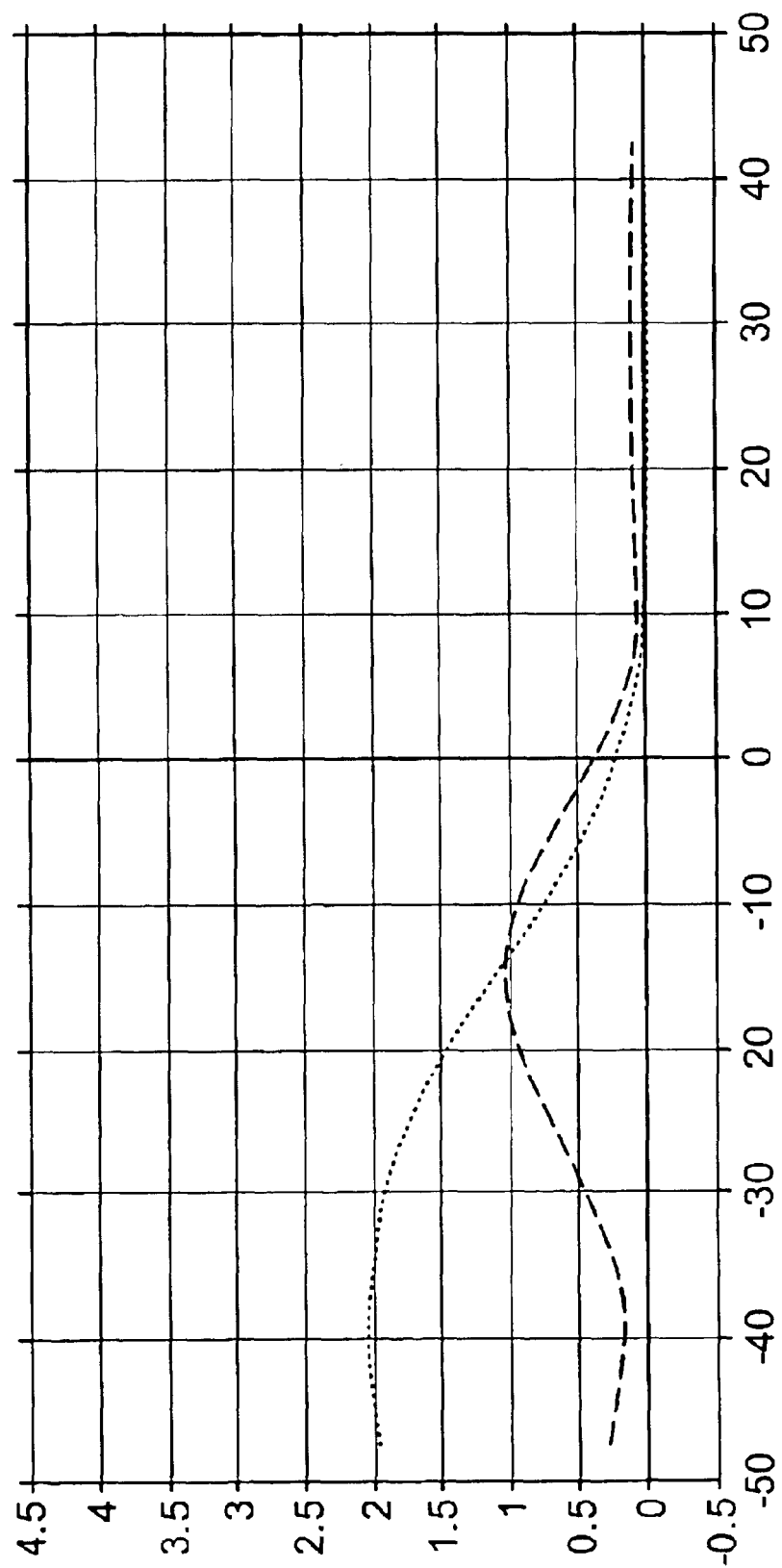
FIG. 4 depicts the channel power profile for the lens of Example 1.

A 1.498 refractive index conventional progressive addition lens, Varilux COMFORT™ lens, is provided with a convex progressive addition surface and a concave spherical surface. The convex surface distance vision zone curvature is 5.25 diopters and the near vision zone curvature is 7.25 diopters. The channel length is 16 mm. The lens distance power is 0.00 diopters and the dioptric add power is 2.00 diopters. The power contour map for the lens is depicted in FIG. 2, the astigmatic contour map is depicted in FIG. 3., and the channel power profile is depicted in FIG. 4. Line A in the Figure is the add power profile and line B is the unwanted astigmatism. The power remains constant from the beginning of the near vision zone, at about 15 mm below the fitting point, through the lens edge at about 25 mm below the fitting point.

Example 2

Figure 5:
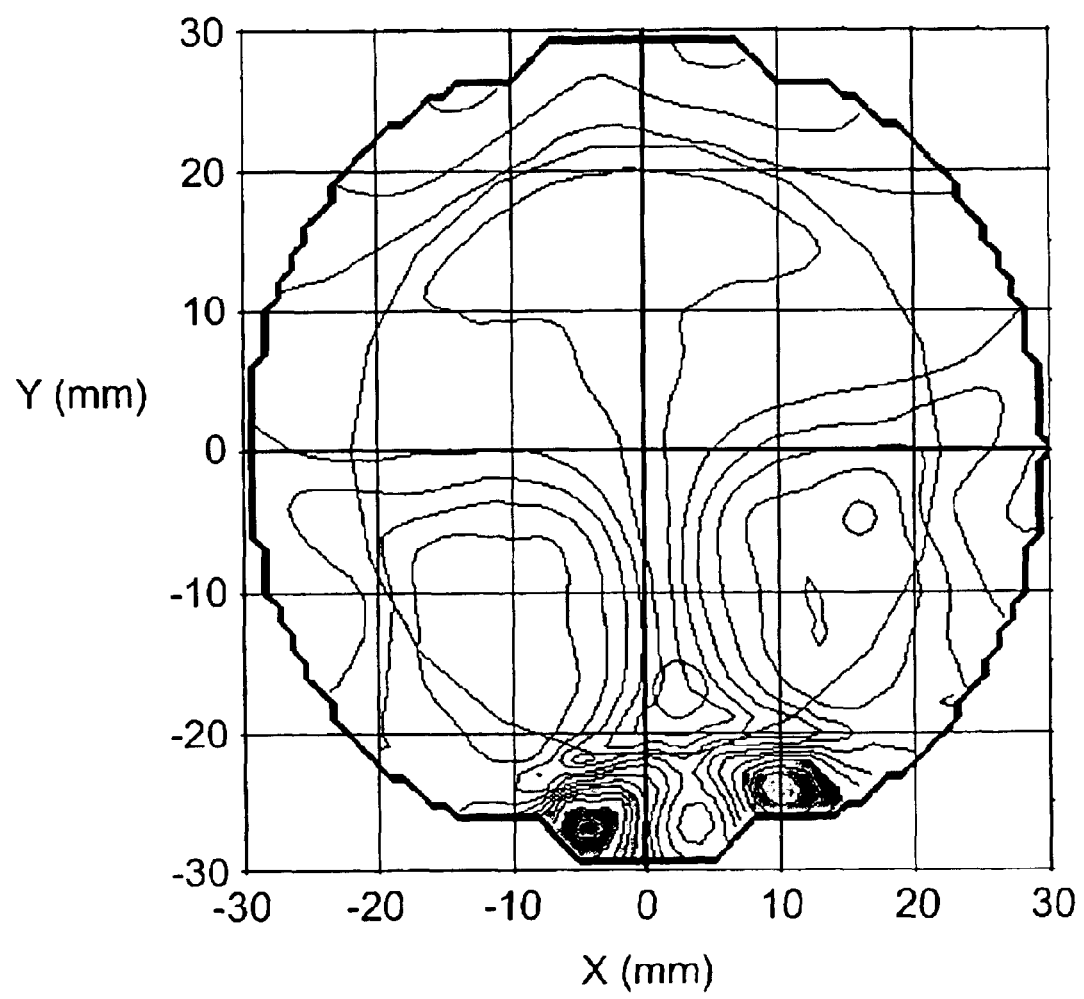
FIG. 5 depicts a scanned image of the channel power profile for the lens of Example 2
Figure 6:
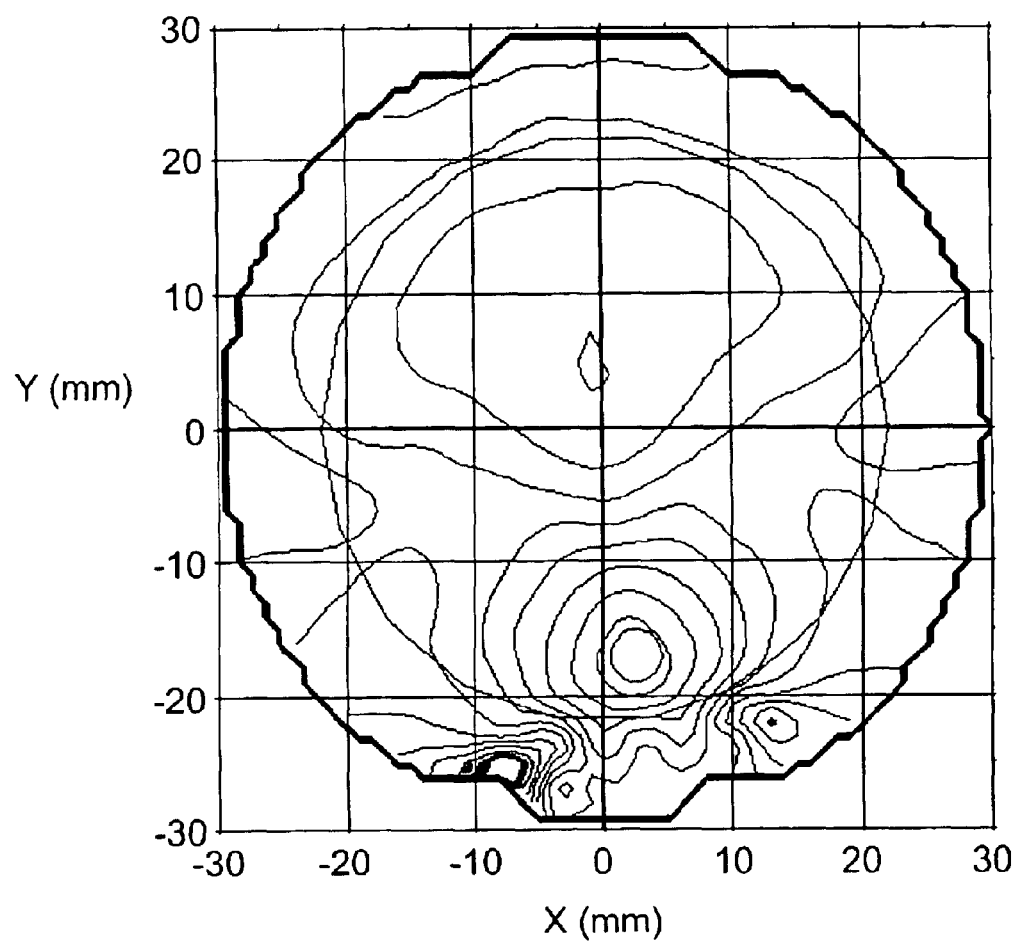
FIG. 6 depicts a scanned image of a power contour map of the lens of Example 2.
Figure 7:
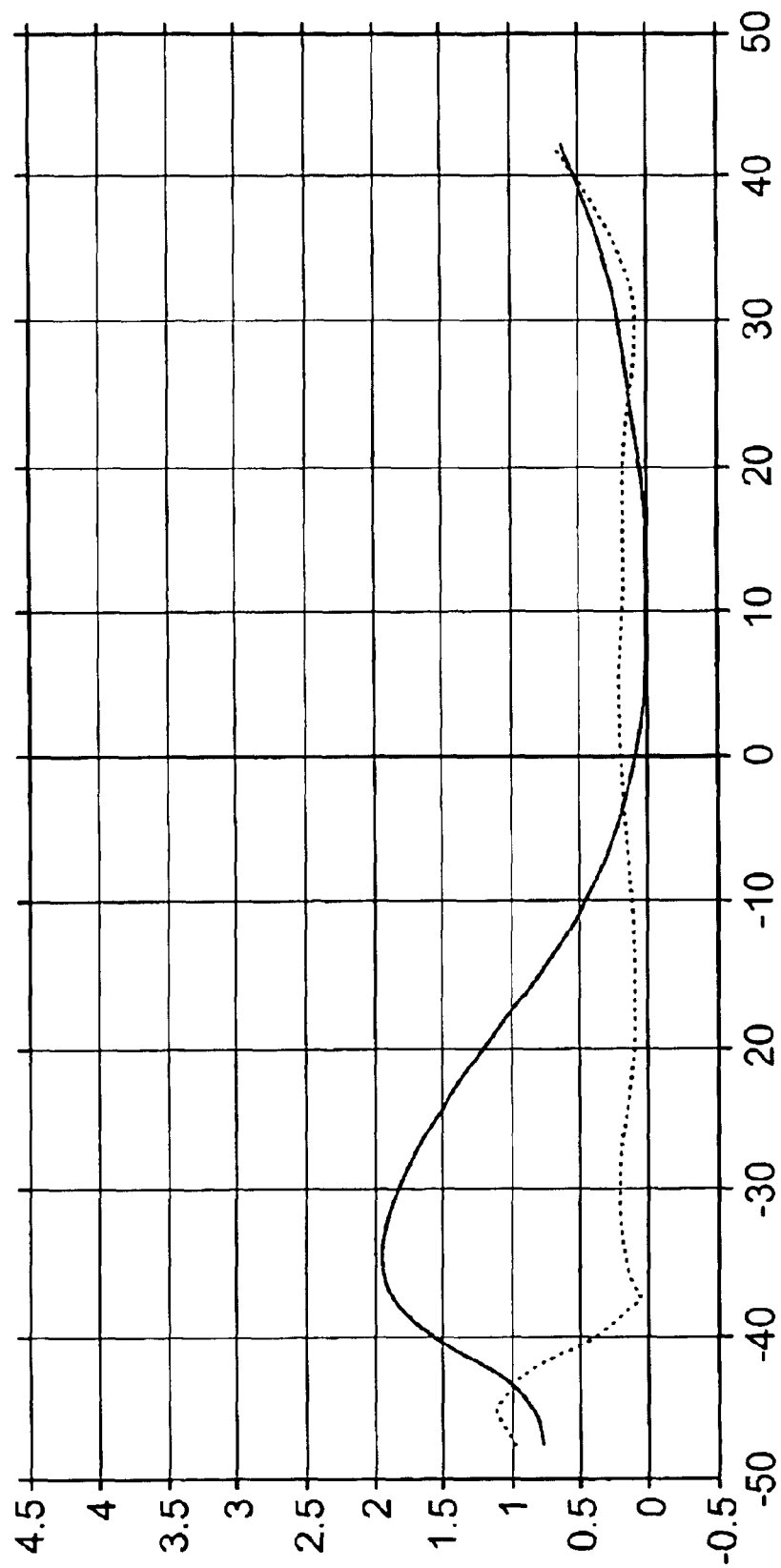
FIG. 7 depicts an astigmatic contour map of the lens of Example 2.

A 1.586 refractive index lens of the invention is provided with a convex progressive addition surface with a distance vision zone curvature of 5.60 diopters, a near vision zone curvature of 7.60 diopters resulting in a lens with dioptric add power of 2.00 diopters and a channel length of 17 mm. A fourth zone is designed as a convex spherical surface with a power of 0.78 diopters. An offset, O=0.31 mm and a tilt, T=0.9 degrees is used to match the curvatures of the spherical and progressives surfaces at their boundary. The blending function, F(x,y) is shown in Table 1. The power of the additional zone reaches 0.78 diopters at 22.5 mm below the fitting point. The additional zone is blended along the prime meridian with the near power, but there are peripheral discontinuities on either side of the zone resulting in increased unwanted astigmatism and image jump. The power contour map for the lens is depicted in FIG. 5, the astigmatic contour map is depicted in FIG. 6, and the channel power profile is depicted in FIG. 7.

TABLE 1

Values for F(x, y) = 0:

F(−24, −40) to F(24, −40), F(−22, −38) to F(22, −38), F(−20, −36) to F(20, −36),
F(−18, −34) to F(18, −34), F(−18, 32) to F(18, −32),
F(−16, −30) to F(16, −30), F(−16, 28) to F(16, −28),
F(−14, −26) to F(−14, 26), F(−12, −24) to F(−12, 24)
F(−12, −22), F(−10, −22), F(−8, −22), F(12, −22), F(10, −22), F(8, −22)

Values for F(x, y) = 0.5

F(−28, −42), F(−26, −42), F(−26, −40), F(−24, −38), F(−24, −36), F(−22, −36), F(−22, −34)
F(−20, −34), F(−20, −32), F(−18, −30), F(−18, −28), F(−16, −26), F(−16, −24), F(−14, −24)
F(−14, −22), F(−6, −22) to F(6, −22)
F(−28, 42), F(−26, 42), F(−26, 40), F(−24, 38), F(−24, 36), F(−22, 36), F(−22, 34)
F(−20, 34), F(−20, 32), F(−18, 30), F(−18, 28), F(−16, 26), F(−16, 24), F(−14, 24)
F(−14, 22)

All other value of F(x, y) = 1.0

What is claimed is:

1. A multifocal lens, comprising: a.) a distance vision power zone; b.) a near vision power zone comprising an add power; c.) an intermediate vision power zone between the distance and near vision power zones; and d.) a fourth zone located inferior to the near vision power zone, wherein the fourth zone has a constant power that is within about 20 to about 80% of the add power.

2. The lens of claim 1, wherein the lens is a progressive addition lens.

3. The lens of claim 1, wherein the refractive power of the fourth zone is about 25 to about 75% of the add power.

4. The lens of claim 1, wherein the fourth zone is blended continuously with the near zone.

5. The lens of claim 1, wherein a width of the fourth zone is about 5 to about 25 mm.

6. The lens of claim 5, wherein a length of the fourth zone is about 10 to about 20 mm.

7. The zones of claim 1, wherein each of the distance, intermediate, near and fourth zone are located on one surface of the lens.

8. The lens of claim 7, wherein the zones are located on the front surface of the lens.

9. The lens of claim 8, further comprising a back surface comprising one or more of a second distance vision power zone, a second near vision power zone, a second intermediate power zone, and a second fourth zone.

10. The lens of claim 9, wherein the front and the back surfaces are misaligned.

11. The lens of claim 1, further comprising a cylinder power.

12. The lens of claim 7, further comprising a cylinder power.

13. The lens of claim 8, further comprising a cylinder power.

14. The lens of claim 9, further comprising a cylinder power.

15. The lens of claim 10, further comprising a cylinder power.

16. A method for designing a lens, comprising the step of providing a lens comprising: a.) a distance vision power zone; b.) a near vision power zone comprising an add power; c.) an intermediate vision power zone between the distance and near vision power zones; and d.) a fourth zone located inferior to the near vision power zone, wherein the fourth zone has a constant power that is within about 20 to about 80% of the add power.

17. The method of claim 16, wherein the fourth zone is a surface $Z'_S(x, y)$ that is produced according to the equation:

$$Z'_S(x, y) = Z_S(x, y) + T*y + O$$

wherein $Z_S(x, y)$ is the fourth zone surface;

T is a tilt in an angle of the fourth zone surface in a direction y; and offset by an amount O is an amount of offset in a direction z.

18. The method of claim 16, further comprising combining the surface $Z'_S(x, y)$ with a progressive surface $Z_P(x, y)$ to produce a surface $Z(x, y)$ according to the equation:

$$Z(x, y) = F(x, y)*Z_P(x, y) + \{1 - F(x, y)\}*Z'_S(x, y)$$

wherein $0 \leq F(x, y) \leq 1$; and

F(x, y) is a blending function.

19. The method of claim 18, further comprising combining surface Z(x, y) with a complementary spherical surface.

20. The method of claim 18, further comprising combining surface Z(x, y) with a complementary toric surface.

* * * * *